United States Patent [19]
Nagao et al.

[11] Patent Number: 4,748,331
[45] Date of Patent: May 31, 1988

[54] FILM THICKNESS MEASURING DEVICE WITH SIGNAL AVERAGING TO COMPENSATE FOR ROLLER ECCENTRICITY

[75] Inventors: Toshishige Nagao; Masayuki Ariki; Yoshiaki Ida, all of Hyogo, Japan

[73] Assignee: Mitsubishi Denki Kabushiki Kaisha, Tokyo, Japan

[21] Appl. No.: 43,711

[22] Filed: Apr. 29, 1987

[51] Int. Cl.[4] .............................................. G01N 21/86
[52] U.S. Cl. ..................................... 250/560; 356/381
[58] Field of Search ................... 250/560, 561, 237 R; 356/376, 381, 382

[56] References Cited

U.S. PATENT DOCUMENTS 3,518,441  6/1970  Selgin ................................. 250/560
4,395,119  7/1983  Nakata et al. ...................... 250/560

*Primary Examiner*—David C. Nelms
*Attorney, Agent, or Firm*—Sughrue, Mion, Zinn, Macpeak, and Seas

[57] ABSTRACT

A film thickness measuring device for measuring the thickness of a film formed on a sheet member conveyed with the rotation of a rotary shaft. The thickness measurement is accomplished based on averaged values for a period of time which is determined according to the rotation speed of the rotary shaft. Consequently, errors due to the eccentricity or uneven surface of the rotary shaft are removed from the measurement values resulting in improving an accuracy of the thickness measurement of the film.

7 Claims, 4 Drawing Sheets

FILM THICKNESS MEASURING DEVICE WITH SIGNAL AVERAGING TO COMPENSATE FOR ROLLER ECCENTRICITY

FIELD OF THE INDUSTRIAL APPLICATION

This invention relates to a film thickness measuring device for measuring the thickness of a film formed on a sheet member in a sheet sheet member manufacturing line such as a magnetic tape manufacturing line.

BACKGROUND OF THE INVENTION

FIG. 1 shows a film thickness measuring device which is proposed in a co-pending U.S. patent application Ser. No. 886,782 filed on July 18, 1986 in which priority is claimed based on Japanese Patent Application No. 174609/1985 filed on Aug. 6, 1985.

In FIG. 1, reference numeral 1 designates a rotary shaft which is rotated at a predetermined speed; 2, a light shielding board which is disposed in parallel with the rotary shaft 1 with a predetermined distance therebetween ; and 3, a sheet including a sheet member and a film formed thereon having a predetermined thickness, the thickness of the film being to be measured. The sheet 3 is conveyed at a speed equal to the rotation speed of the rotarys shaft 1 while being in close contact with the latter 1.

Further in FIG. 1, laser beam generators 4 and 5 are arranged at predetermined angles with respect to each other, for generating laser beams 4a and 5a, respectively, A reflecting mirror 6 is provided to cause the laser beam 4a to scan a gap A shown in FIG. 2 between the surface of the rotary shaft 1 and the light shielding board 2. Further, the reflecting mirror 6 also causes the laser beam 5a to scan a gap B shown in FIG. 2 between the sheet 3 under measurement and the light shielding board 2. Reference numerals 7 and 8 designate lenses for converging the laser beams 4a and 5a, respectively, which have been reflected by the reflecting mirror 6; 9 and 10, lenses for converging the laser beams 4a and 5a which have scanned the gaps A and B, respectively; 11 and 12, light receiving units; 13 and 14, counters; 15, an arithmetic unit; and 16, a display unit.

The film thickness measuring device thus constructed operates as follows:

The laser beams 4a and 5a generated by the laser beam generators 4 and 5 are directed to the reflecting mirror 6, so that they are caused to scan the respective gaps A and B at the same angular velocity. The laser beams 4a and 5a reflected by the mirror 6 are converged by the lenses 7 and 8 so that they are made minimum in beam diameter at the gaps A and B, respectively, and are run in a direction perpendicular to the rotary shaft 1; i.e., in the direction of the gaps at the predetermined speed. In this operation, the light receiving units 11 and 12 receive the laser beams 4a and 5a which have passed through the gaps A and B, respectively. Accordingly, the output signals of the light receiving units 11 and 12 are pulse signals, the widths of which are proportional to the dimensions of the gaps A and B. The pulse signals are counted by the counters 13 and 14, the counted values of which are applied to the arithmetic unit 15 where the thickness is calculated using the counted values. The thickness thus calculated is displayed on the display unit 16.

The thickness $t_x$ of the sheet member 3 under measurement can be obtained from the following equation (1):

$$t_x = t_o(1 - b/a) \quad (1)$$

where a is the counted value of the counter 13, b is the counted value of the counter 14, and $t_o$ is the dimension of the gap A which has been set.

The film thickness t can be obtained by subtracting from the thickness $t_x$ of the sheet 3 thus calculated the thickness of the sheet member which has been known.

As was described above, the film thickness measuring device shown in FIG. 1 measures the thickness of the sheet member and that of the film formed thereon by referring to the dimension of the gap between the rotary shaft and the light shielding plate as a reference value. Therefore, the film thickness measuring device suffers from difficulties that, as the rotary shaft turns, the dimension of the gap varies with time because of the eccentricity of uneven surface of the rotary shaft and accordingly the measurement value also varies; that is, the measurement is not stable nor accurate.

SUMMARY OF THE INVENTION

Accordingly, an object of this invention is to eliminate the above-described difficulties. More specifically, an object of the invention is to provide a film thickness measuring device in which the measurement is not affected by the eccentricity or uneven surface of the rotary shaft supporting the member.

The above and other objects of the invention is accomplished by the provision of a film thickness measuring device in which the scanning operation is carried out a plurality of times for every revolution of the rotary shaft, and the resultant data are averaged thereby to obtain the average of variation in dimension of the gap which attributes to the eccentricity or uneven surface of the rotary shaft, thereby to measure the thickness of the film stably at all times. The speed of rotation of the rotary shaft is detected with a rotation sensor coupled to the rotary shaft, so that the averaging operation is automatically carried out with high efficiency.

BRIEF DESCRIPTION OF THE INVENTION

DESCRIPTION OF THE PREFERRED EMBODIMENTS

Figure 1:
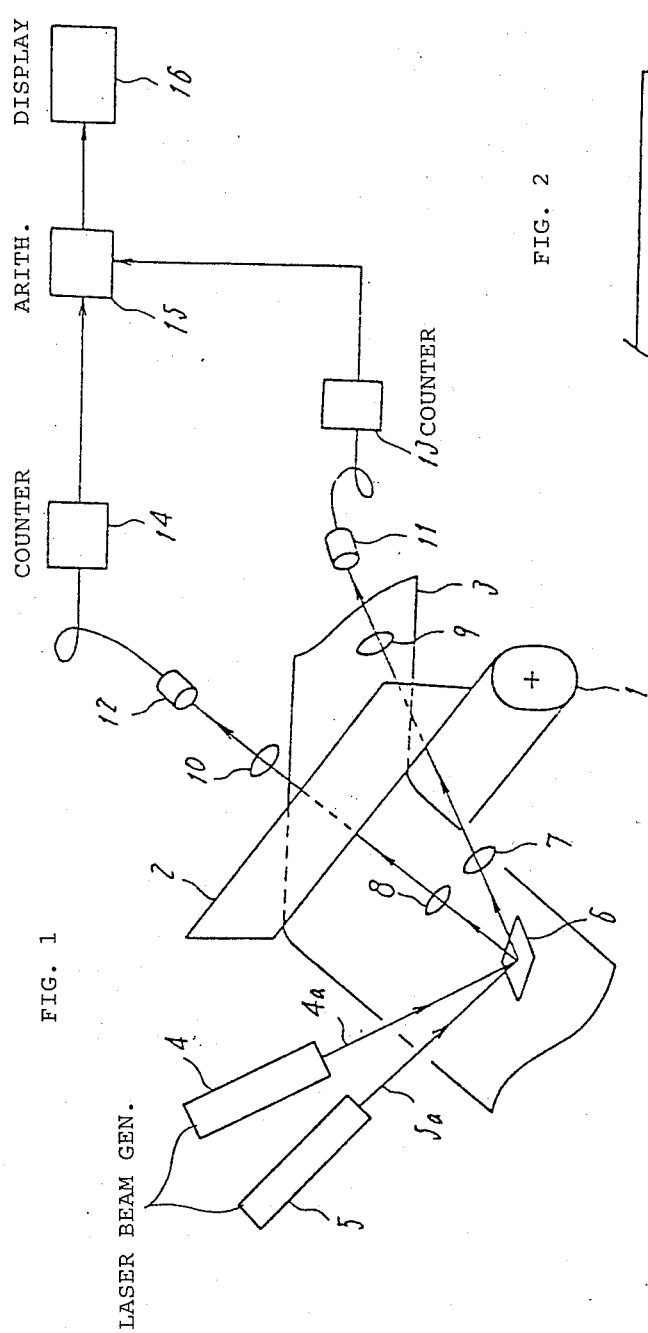
FIGS. 1 and 2 are explanatory diagrams showing the arrangement of a film thickness measuring device which has been proposed in the co-pending application.
Figure 2:
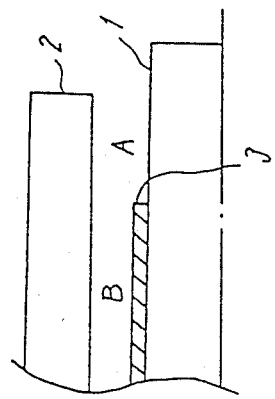
Figure 3:
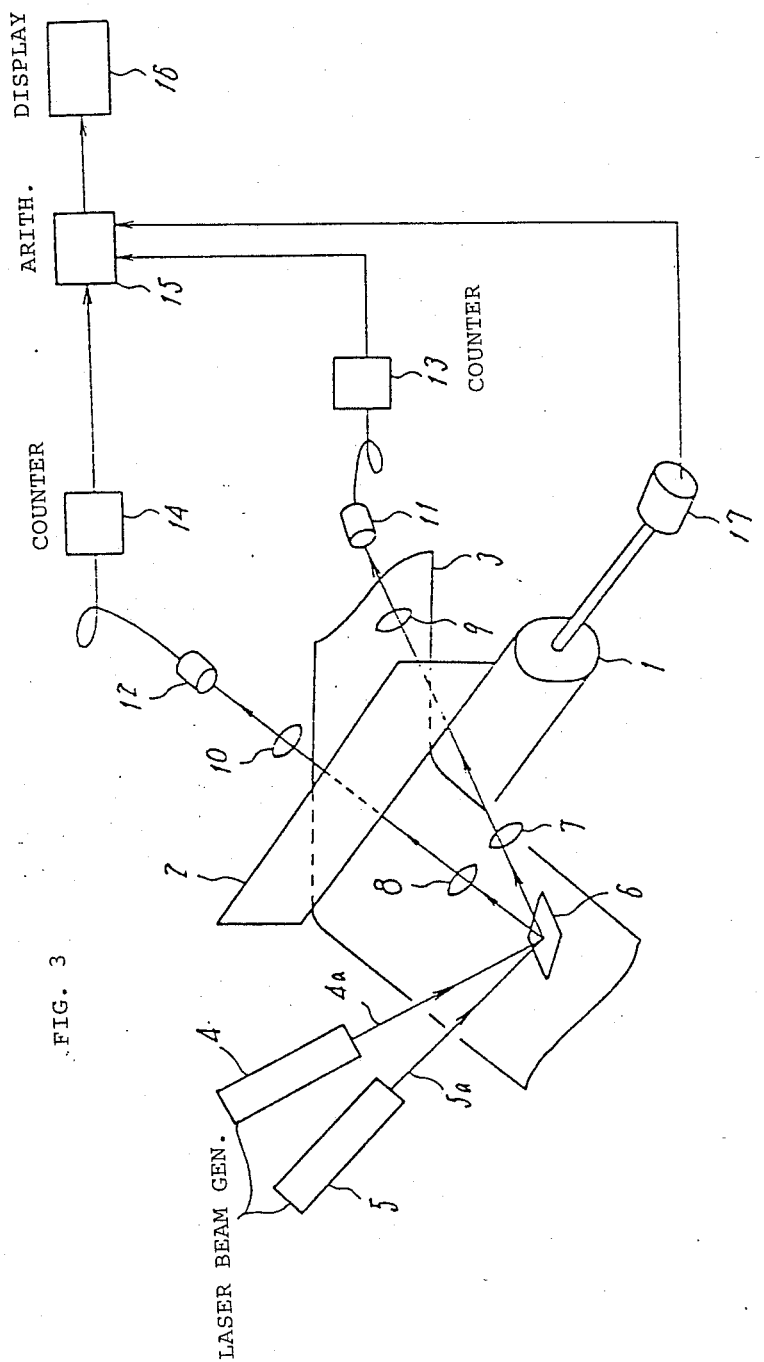
FIG. 3 is an explanatory diagram showing the first embodiment of the present invention.

A preferred embodiment of this invention will be described with reference to FIG. 3. In FIG. 3, reference numerals 1 through 16 designate those which have been designated by the same reference numerals in FIG. 2, and reference numeral 17 designates a rotation sensor for producing a pulse signal every revolution of the rotary shaft 1.

The operation of the embodiment thus constructed will be described. In the rotary shaft 1, in general, its surface is uneven, and its axis of rotation is not coincident with the central axis of the rotary shaft 1; that is, the former is eccentric from the latter.

Because of these facts, the counted value a corresponding to the dimension of the gap A (FIG. 2) between the rotary shaft 1 and the light shielding board 2 changes in a range of from a maximum value $a_{max}$ to minimum value $a_{min}$. Similarly, the counted value b corresponding to the dimension of the gap B between the sheet 3 and the light shielding board 2 changes in a range of from a maximum value $b_{max}$ to a minimum value $b_{min}$ even if the sheet 3 is uniform in thickness. Therefore, the thickness $t_x$ of the sheet calculated according to the equation (1) falls in a range of from a maximum value $t_{xmax}$ to a minimum value $t_{xmin}$ which are expressed by the following equations (2) and (3):

$$t_{xmax} = t_o (1 - (b/a)_{min}) \quad (2)$$

$$t_{xmin} = t_o (1 - (b/a)_{max}) \quad (3)$$

where $(b/a)_{min}$ and $(b/a)_{max}$ are the minimum value and the maximum value of $(b/a)$, respectively, which are obtained when a and b are measured at the same position on the rotary shaft 1.

Accordingly, the thickness measured includes an error ranged from $t_{xmax}$ to $t_{xmin}$.

In the film thickness measuring device of the invention, the reflection mirror of the scanning mechanism is operated at a speed higher than the speed or rotation of the rotary shaft 1, and the values a and b are measured several times per revolution of the rotary shaft 1. And in the arithmetic unit 15, average values $a_{av}$ and $b_{av}$ are obtained from the values a and b thus measured, respectively. These averaged values $a_{av}$ and $b_{av}$ are used to calculate the thickness $t_x$ according to the following expression:

$$t_x = t_o - (1 - b_{av}/a_{av}) \quad (4)$$

As a result, the error included in the thickness $t_x$, which attributes to the eccentricity or uneven surface of the rotary shaft, is minimized. If the averaging operation is effected for one revolution of the rotary shaft, more specifically, if the averaging operation is effected for data sampled during one revolution period thereof and the oldest data within data sampled is renewed in turn as new data is sampled, then the error can be completely eliminated. The rotation sensor 17 operates to produce a pulse signal every revolution of the rotary shaft 1 which is applied to the arithmetic unit 15. In the arithmetic unit 15, the data received during one revolution of the rotary shaft are averaged for calculation of the thickness. Therefore, no error attributing to the eccentricity or uneven surface of the rotary shaft 1 is included in the measurement value; that is, the thickness can be measured with high accuracy.

As mentioned above, the film thickness t can be obtained by subtracting from the thickness $t_x$ of the sheet 3 thus calculated the averaged thickness of the sheet member which has been known.

Figure 4:
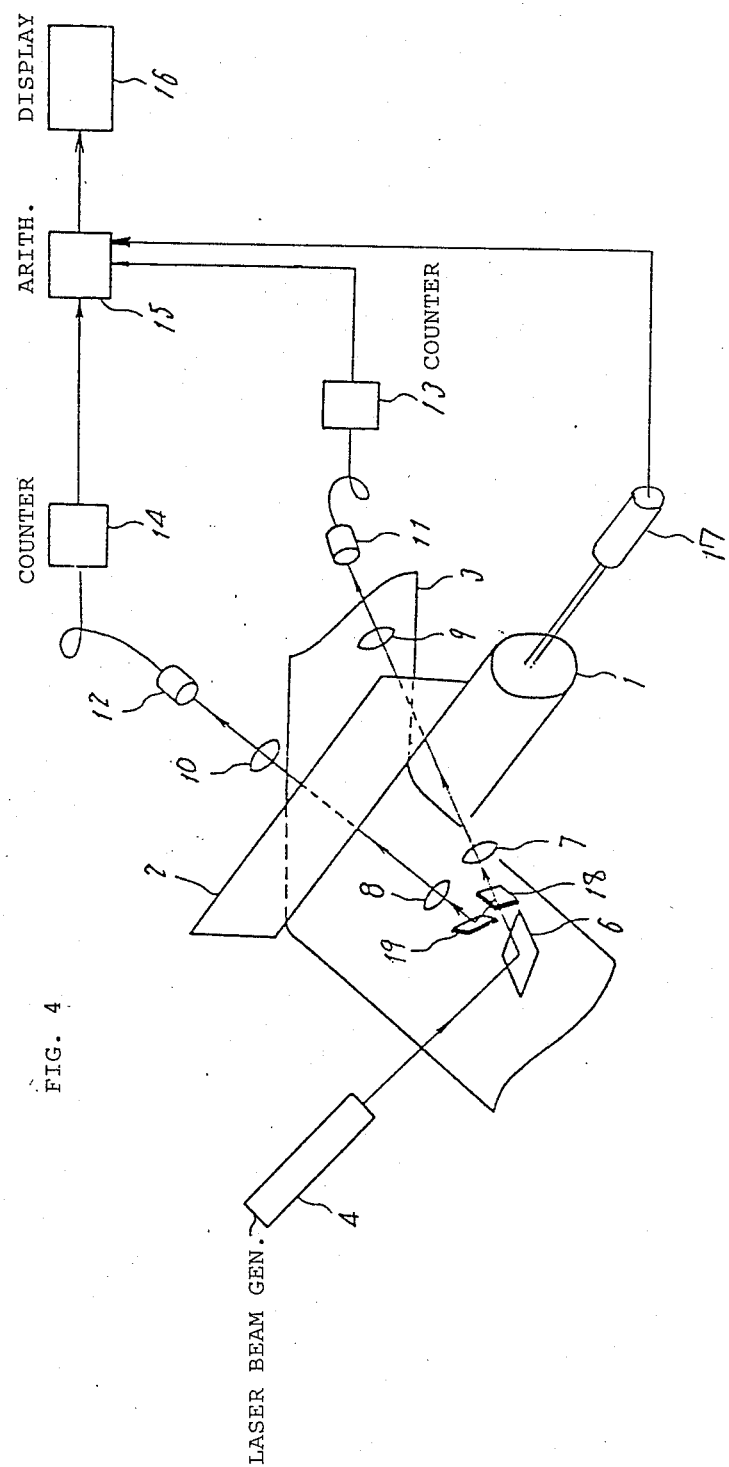
FIGS. 4 and 5 are explanatory diagram showing the second and third embodiments of the present invention.

A second embodiment of the invention will be described with reference to FIG. 4. In FIG. 4, reference characters 1 through 4, 4a, 5a and 6 through 17 designate those which have been designated by the same reference characters in FIG. 3, and reference characters 18 and 19 designate a half-mirror and a total reflection mirror, respectively.

The operation of the second embodiment thus constructed with be described. A laser beam from the laser beam source 4 is applied to the half-mirror 18, where it is divided into a component which passes through the half-mirror 18 and a component which is reflected by the half-mirror 18. The former laser beam is applied directly to the reflecting mirror 6. The latter laser beam is applied to the total reflection mirror 19, so that it is reflected by the latter 19 to form a predetermined angle, thus reaching the reflecting mechanism of the scanning mechanism. The two laser beams thus obtained act completely in the same manner as the two laser beams 4a and 5a from the two laser beam sources 4 and 5 in the film thickness measuring device described above. Thus, a high precision film thickness measuring device using two laser beams from one laser beam source has been provided according to the invention. If, in this connection, a semiconductor laser collimated is used as the laser beam source, then a film thickness measuring device small in size and low in manufacturing cost can be obtained according to the invention.

Figure 5:
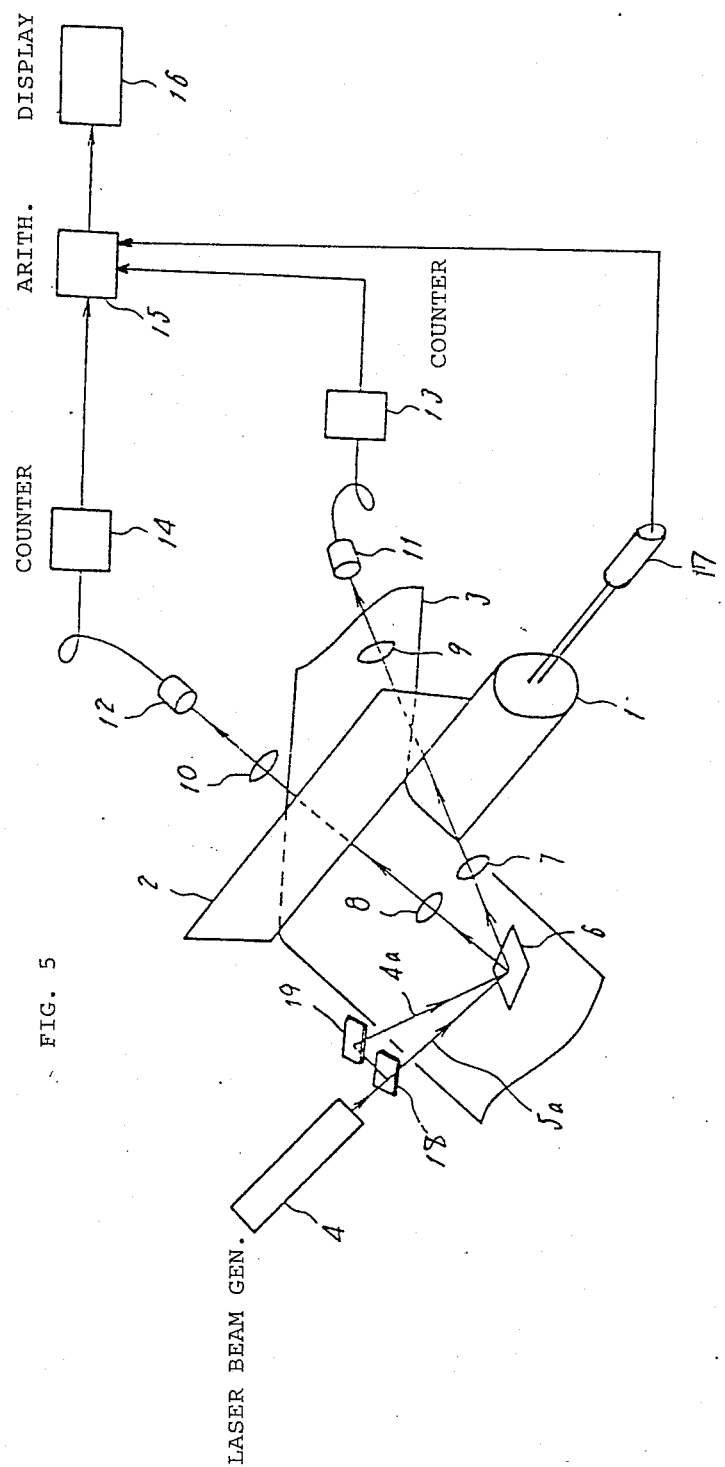

In the above-described embodiment, a beam splitter, i.e., the half-mirror is used to divide the laser beam into two laser beams, which are applied to the reflecting mirror. However, the same effect can be obtained by a device in which, as shown in FIG. 5, the laser beam from the light source 5, before being reflected from the reflecting mirror 6, is divided into two parts.

The film thickness measuring device shown in FIG. 5 operates as follows: The laser beam from the laser beam source 4 is applied to the reflecting mirror 6 so that it is deflected with time. The scanning beam is applied to the half-mirror 18 where it is divided into two parts: a first laser beam which passes through the half-mirror 18 and a second laser beam which is reflected by the half-mirror 18. The first laser beam is applied directly to the condenser lens 7, thus acting as a scanning beam. On the other hand, the second laser beam is applied to the total reflection mirror 19 so as to be reflected by the latter 19. The second laser beam thus reflected is applied to the condenser lens 8, thus operating as a scanning beam. The two scanning beams thus provided act completely in the same manner as the two laser beams 4a and 5a from the two laser beam sources 4 and 5 in the film thickness measuring device with the same effects described above.

As described above, in the film thickness measuring device of the invention, the rotation sensor coupled to the rotation shaft outputs one pulse per revolution of the rotary shaft, and the data received through scanning during the time interval between two pulses which are produced successively by the rotation sensor are averaged to calculate the thickness. Therefore, the error attributing to the eccentricity or uneven surface of the rotary shaft is completely removed from the measurement value. Thus, the film thickness measuring device of the invention can measure the thickness of a film with high accuracy.

Further, in the film thickness measuring device of the invention, the laser beam emitted from one laser beam generator, after being deflected, is split into two laser beams, and the direction of advancement of one of the two laser beams is changed with the total reflection mirror; that is, two laser beams different in an advancement direction are obtained from one laser beam source. Therefore, the device of the invention is simple in construction and small in size.

For the same reason, the amount of heat generated by the device using a single laser beam generator is reduced to half of that generated by an ordinary film thickness measuring device using two independent laser beam generators. Thus, the device of the invention is more stable in characteristic than the ordinary device.

What is claimed is:

1. A film thickness measuring device for measuring the thickness t of a film formed on a sheet member which is conveyed with the rotation of a rotary shaft while being kept in close contact with said rotary shaft, comprising:
    a light shielding member disposed in parallel with said rotary shaft with a predetermined distance therebetween;
    means for scanning a first space between said light shielding member and the surface of said rotary shaft with a first laser beam and a second space between said light shielding member and the surface of said film with a second laser beam;
    means for receiving said first and second laser beams after scanning operation to produce first and second electric signals representing the widths of said first and second spaces, respectively;
    means for carrying out an arithmetic operation to obtain the thickness t of said film based on said first and second electric signals; and
    means for detecting the rotation speed of said rotary shaft, which is coupled to said arithmetic means,
    said means for receiving operating to produce a plurality of said first and second electric signals for a period of time defined by the output of said detecting means, and said arithmetic means operating to average said first and second electric signals produced for the period of time so as to obtain the thickness of said film based on said first and second electric signals averaged.

2. The film thickness measuring device as defined in claim 1 wherein the output of said detecting means is a pulse signal produced every rotation of said rotary shaft.

3. The film thickness measuring device as defined in claim 1 wherein said arithmethic means operates to calculate the thickness t of said film according to the following expressions:

$$t_x = t_o (1 - b_{av}/a_{av})$$

$$t = t_x - T$$

where $a_{av}$ is an averaged value of said first electric signals, $b_{av}$ is an averaged value of said second electric signals, $t_o$ is a width of said first space, $t_x$ is a total thickness of said film and sheet and T is an averaged thickness of said sheet which has been known.

4. The film thickness measuring device as defined in claim 1 wherein said first and second laser beams are generated by two independent laser beam generators, respectively.

5. The film thickness measuring device as defined in claim 1 wherein said first and second laser beams are obtained by splitting one laser beam with a beam splitter which is emitted from a single laser beam generator.

6. The film thickness measuring device is claimed in claim 5 wherein said scanning means comprises said beam splitter disposed between said laser beam generator and a total reflecting mirror for scanning.

7. The film thickness measuring device as defined in claim 5, wherein said beam splitter so disposed as to split a laser beam which has been reflected by said total reflecting mirror.

* * * * *